United States Patent [19]

Beck et al.

[11] 4,429,720

[45] Feb. 7, 1984

[54] APPARATUS FOR SEEKING OUT AND REPAIRING LEAKS IN PIPES

[76] Inventors: Richard D. Beck, P.O. Box 7247; Campbell H. Steketee, Jr., 3421 25th St., S.E., both of Salem, Oreg. 97303

[21] Appl. No.: 421,904

[22] Filed: Sep. 23, 1982

[51] Int. Cl.³ .......................................... F16L 55/18
[52] U.S. Cl. .................................................... 138/97
[58] Field of Search ...................... 138/89, 91, 93, 95, 138/97, 98

[56] References Cited

U.S. PATENT DOCUMENTS

| 3,750,711 | 8/1973 | Conklin | 138/97 |
| 3,834,422 | 9/1974 | Larson | 138/93 |
| 3,958,607 | 5/1976 | Gray | 138/97 |
| 4,203,473 | 5/1980 | Roberson | 138/93 |

FOREIGN PATENT DOCUMENTS

| 933475 | 9/1973 | Canada | 138/94 |
| 2053725 | 5/1971 | Fed. Rep. of Germany | 138/89 |

Primary Examiner—John W. Shepperd
Attorney, Agent, or Firm—Eugene M. Eckelman

[57] ABSTRACT

An elongated, flexible body member has leading and trailing end portions and is expandable by air pressure. The body member includes conduits and fittings for allowing such expansion and also has conduits and fittings capable of air testing an area of pipe sealed off by ends of the body member and also capable of discharging grout in such sealed off area. An expandable propelling head is connected to the body member by a fluid operated double acting cylinder whereby upon selected inflation and deflation of the head and operation of the cylinder the body member can be propelled in a pipe. The connection between the propelling head and the body member is flexible to allow the assembly to negotiate bends in a pipe. The body member includes a mixing chamber for mixing a grout and a catalyst therefor prior to discharge into the pipe.

10 Claims, 6 Drawing Figures

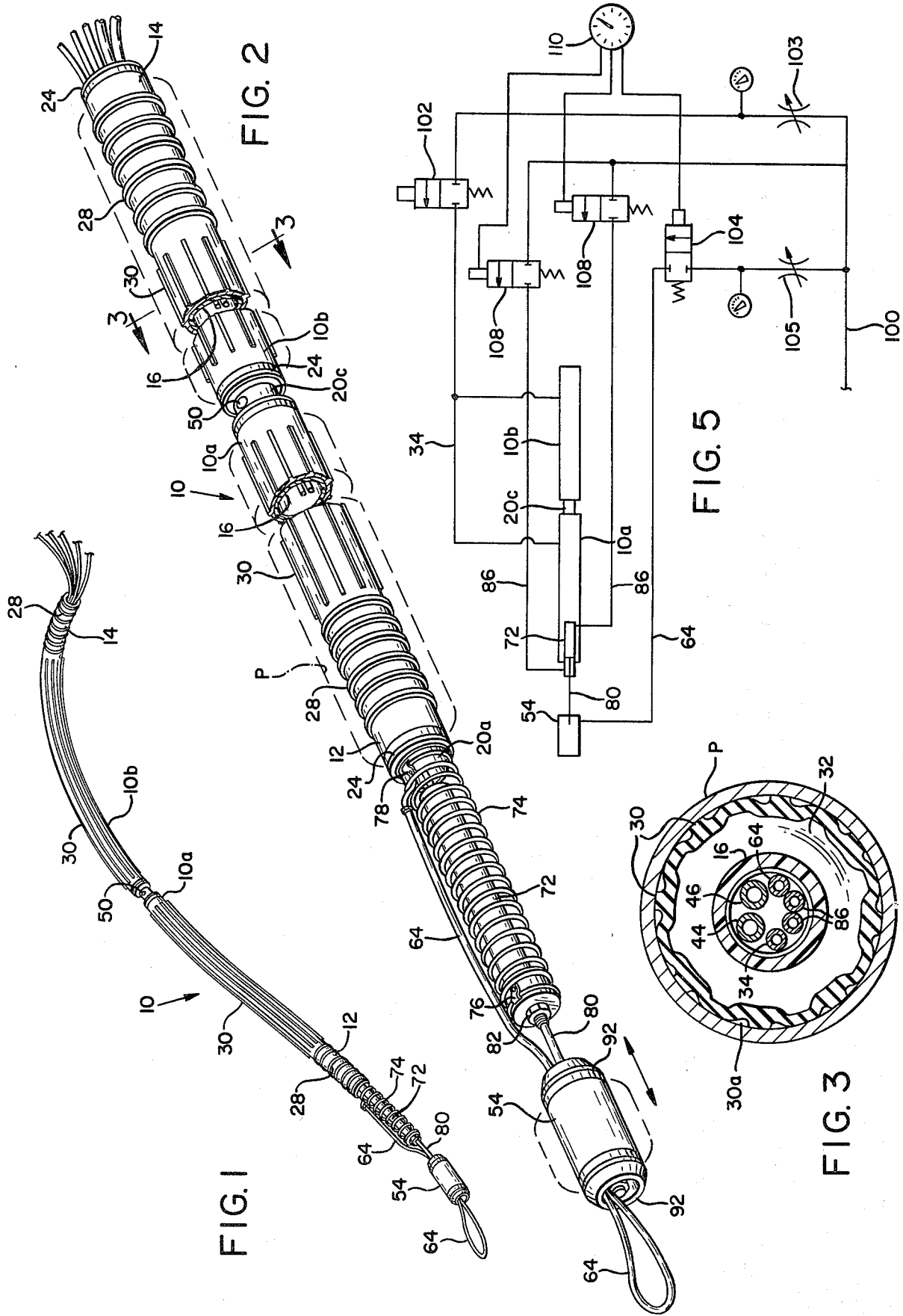

APPARATUS FOR SEEKING OUT AND REPAIRING LEAKS IN PIPES

FIELD OF THE INVENTION

This invention relates to apparatus for seeking out and repairing leaks in pipes.

BACKGROUND OF THE INVENTION

Many pipes or conduits, such as sewer laterals, phone ducts, or the like, are buried deep in the ground. Such pipes often develop leaks and it is expensive and time consuming to dig down from the surface and repair the leak. Attempts have been made to repair leaks by moving grout applying apparatus into the pipes through clean-out openings, but such devices have not possessed all the desired characteristics, namely, the ability to propel themselves efficiently along the pipe, especially around bends, to precisely seek out the leak, and to apply a repair substance such as grout in an efficient manner.

SUMMARY OF THE INVENTION

A primary objective of the invention is to provide apparatus for seeking out and repairing leaks in pipes which is simplified and inexpensive in its construction, which efficiently propels itself along a pipe as well as being capable of retracting itself out of the pipe, which readily negotiates turns in the pipe, which can isolate a section of a pipe and air test such isolated section for leaks, and which can inject a chemical grout in the isolated section in an efficient manner for repair of the leak.

The apparatus employs an elongated flexible body member arranged to be inserted in a pipe. The body member has leading and trailing end portions and has a length sufficient such that an intermediate portion can span a leak in a pipe. The leading and trailing end portions are radially expandable, and inflating means are associated with the body member for expanding the leading and trailing end portions for sealing such ends against the interior surface of a pipe. The body member also has means for discharging grout along the intermediate portion thereof and into a leak in the pipe. The apparatus includes pressured air inlet means arranged to admit pressured air prior to admitting grout for testing a portion of a pipe for leaks between the leading and trailing ends. The intermediate portion of the body member is also radially expandable and has longitudinal surface passageways for guiding the flow of grout therealong. The device employs an expandable head adjacent the leading end which is flexibly connected to the body member. The expandable head has an inflatable portion arranged to expand it against the interior surface of a pipe to obtain a grip on the pipe. A double acting fluid operated cylinder is connected between the body member and the head whereby upon selected inflation and deflation of the head and operation of the fluid operated cylinder means the body member is arranged to be pulled along a pipe to the point to be tested for leaks, or pushed back out of the pipe in a reverse sequence.

The invention will be better understood and additional objects and advantages will become apparent from the following description taken in connection with the accompanying drawings.

BRIEF DESCRIPTION OF THE DRAWINGS

FIG. 1 is a perspective view of apparatus embodying features of the invention for seeking out and repairing leaks in pipes;

FIG. 2 is a foreshortened perspective view of the apparatus, this view being enlarged relative to FIG. 1;

FIG. 3 is an enlarged cross sectional view taken on the line 3—3 of FIG. 2;

FIG. 5 is a schematic diagram of the apparatus and operating mechanism therefor.

DETAILED DESCRIPTION OF A PREFERRED EMBODIMENT

Figure 4A:
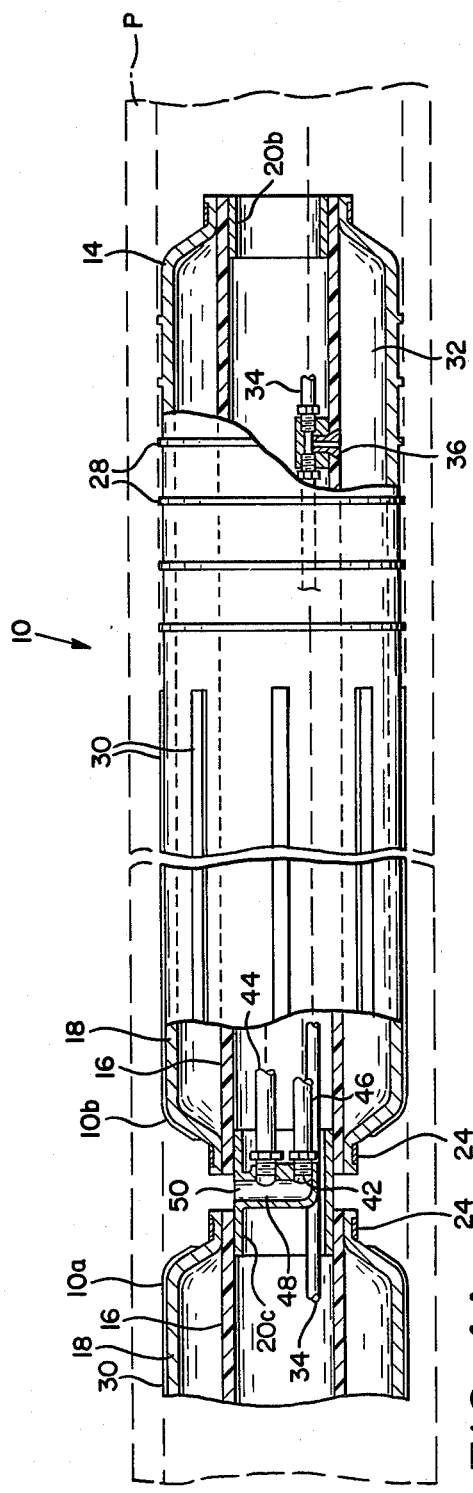
FIGS. 4A and 4B are composite views, with FIG. 4B forming a left-hand extension of FIG. 4A, these views being broken away to show internal structure and being foreshortened.

With particular reference to the drawings and first to FIGS. 1–4, the apparatus of the invention comprises an elongated body member 10 having a leading end portion 12 and a trailing end portion 14. The body member 10 may be of any suitable length depending upon the requirements thereof. Although the device will be used on the smaller type pipe, it is to be understood that it can be made to accommodate any size pipe. An overall length of 6 to 8 feet will repair most of the smaller laterals such as sewer laterals.

Body member 10 is constructed of two or more sections 10a and 10b each comprising a central tube 16 and an outer tube 18. The tubes 16 and 18 of these sections are vulcanized together at end portions thereof and clamped by clamps 24 to steel ring connectors 20a and 20b at the leading and trailing ends, respectively, and to an intermediate steel connector 20c between the two sections 10a and 10b. Any number of sections may be employed for making up the body member depending upon the length desired.

The leading and trailing ends 12 and 14, respectively, of the body member 10 are provided with a plurality of circumferential ribs 28 on their outer surfaces extending in parallel spaced relation. The outer surface of the intermediate portion of the body member has longitudinal ribs 30 extending in parallel spaced relation.

The inner areas or compartments between the tubes 16 and 18 comprise inflatable areas 32, and an air supply conduit 34 leads into the central tube 16 through connector 20b. This conduit is vulcanized at 36 into the central tube 16 to open into the adjacent area 32. Conduit 34 also extends forward from its connection 36 through the center connector 20c to a vulcanized connection 36a in the tube 16 of body member section 10a and similarly opens into adjacent area 32 whereby the two sections 10a and 10b can be simultaneously inflated and deflated.

In the manufacture of the body member 10 the central tubes 16 are constructed of less flexibility than the outer tubes 18 whereby to provide longitudinal rigidity to the sections but at the same time the outer tubes can have rapid expansion against the pipe. Although the central tubes may be distorted inward somewhat during inflation, their shape will be primarily maintained by conduits which they enclose such as conduit 34 and others to be described. In addition, the leading and trailing end portions 12 and 14 of the body member have greater flexibility than the intermediate portion of the body member whereby as will be more apparent hereinafter, the leading and trailing ends can be inflated without totally inflating the intermediate portion.

The center connector 20c includes fittings 42 for a pair of conduits 44 and 46 which extend inwardly from the trailing end of the body member through connector 20b and which are associated with outside grout supply means and catalyst supply means for the grout, respectively, not shown. Connector 20c has a mixing chamber 48 at the fittings 42, and such chamber has an outlet port 50. Although conduits 44 and 46 are described as grout and catalyst conduits, one or both of these conduits are used for admitting air under pressure prior to admitting the grout or catalyst, for a purpose to be more fully described hereinafter.

Body member 10 is associated with a propelling head 54 comprising a central rigid tube 56 and an outer flexible tube or housing 58 secured on the central tube by end clamp rings 60. Central tube 56 has a front wall 61 secured integrally to the tube 56 as by welding. Outer tube 58 forms an inflatable area 62 with the central tube, and such area is associated with a flexible conduit 64, preferably an armored conduit leading in from the rear of the body 10 through connectors 20c and 20a looped through an aperture 66 in the front wall 61 to allow longitudinal movement of the propelling head relative to the body member 10. Conduit 64 leads from a pressure source through the trailing end of the body member and has a fitting 68 in the central tube 56 communicating with a port 70 into the inflatable area 62.

Mechanical connection between the body member 10 and the propelling head 54 is accomplished by means of a double acting fluid operated cylinder 72 and an elongated enlarged coil tension spring 74 housing the cylinder. The cylinder is secured at its front end to the spring by suitable clamp means 76. The rearward end of the spring 74 is secured to the connector 20a by suitable clamp means 78. The piston rod 80 of the cylinder projects forwardly and is secured, as by nuts 82, to wall 61 of the propelling head in a push-pull type connection. Piston rod 80 has a universal joint 84 incorporated therein which allows the propelling head to be disposed angularly relative to the cylinder such as at bends in a pipe, as will be more apparent hereinafter. Spring 74 allows the head to follow bends in a pipe ahead of the body member 10 and at the same time provides a push pull connection, also as will be more apparent hereinafter. Cylinder 72 has supply conduits 86 which lead inwardly from the rearward end of the body member and which have suitable connection to a controlled source of pressure. Propelling head 54 has front and rear annular bumper members 92, preferably constructed of an impact resistant plastic and tapered on their side edges 94 for providing minimum possibility of the head 54 from hanging up in a pipe. The bumper members 92 are clamped in place by elongated bolts 96.

In the operation of the present apparatus, it is inserted in a pipe P such as through a cleanout opening or the like, with the head 54 first. Both the propelling head and the body member are deflated at this time. FIG. 2 shows the parts in deflated condition in full lines and in inflated condition in broken lines. When the assembly has been moved down manually as far as possible, the propelling head 54 and cylinder 72 are actuated as follows. The fluid operated cylinder 72 is operated to extend its piston rod 80 to move the propelling head 54 forwardly relative to the body member 10, the cylinder pushing rearwardly on the body member by the compressive strength of the spring. After the piston rod is extended, the propelling head 54 is inflated to grip the interior surface of the pipe and the fluid pressure to the cylinder 72 then reversed for pulling the body member 10 up to its normally spaced position relative to the head, the connection of the pulling force between the head and body member comprising the spring 74. Spring 74 and universal joint 84 are sufficiently strong to withstand these compression and tension forces but at the same time will bend to allow the head 54 to advance around bends or corner junctions. The spring allows the cylinder to move to an angular position relative to the body member so as also to advance around bends or the like. Thus, head 54 and cylinder 72 will negotiate any normal bend in the pipe, and the body portion 10 of course has sufficient flexibility also to negotiate any bend. After the cylinder has pulled the body member up to its normally spaced position relative to the head 54, the propelling head 54 is deflated and the cycle repeated as many times as necessary.

When the device has reached an area suspicious of leakage, air pressure is admitted to the areas 32 of the body member through conduit 34. This air pressure expands the leading and trailing ends 12 and 14 whereby the ribs 28 provide a seal against the inner surface of the pipe. As stated hereinbefore, these areas have less flexibility than the intermediate portion of the body member whereby with the use of a selected pressure, the leading and trailing ends 12 and 14 are expanded but the intermediate portion is not expanded or at least only partially expanded. Air under pressure is then admitted through one or both of the conduits 44 and 46. Such pressured air flows out port 50 to the area along the exterior of the body member between the leading and trailing sections of the end rings 28, namely, in that area of the body member having the longitudinal ribs 30. If there is a leak in the pipe such can be readily determined by pressure gauge means. If no such leak is found, the device is propelled forwardly to the next test area.

Figure 4B:
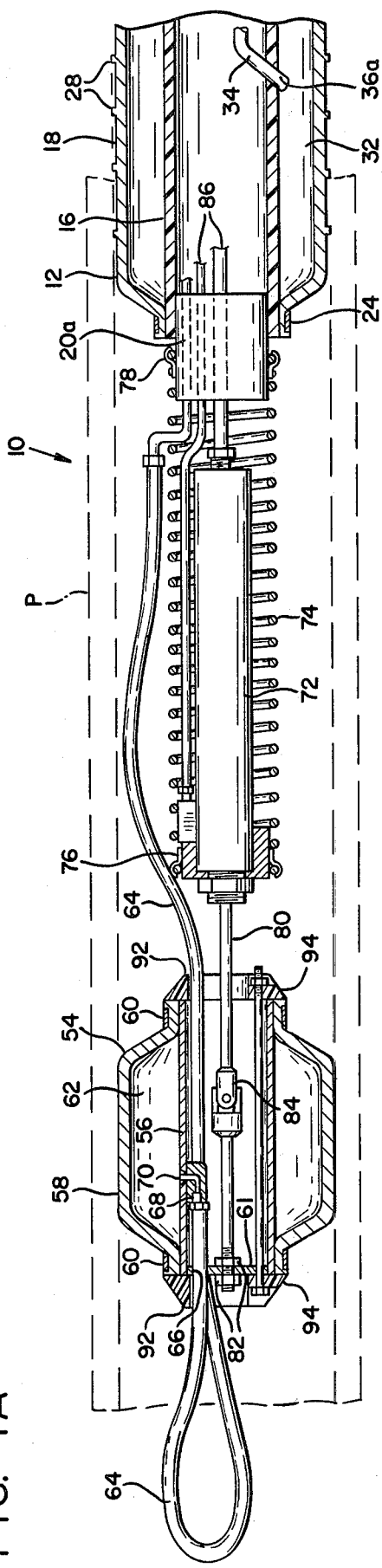

When the leak is found, the areas 32 of the body member are fully inflated, namely, a greater pressure is applied than the leak testing pressure whereby the leading and trailing ends 12 and 14 again seal tightly against the inner surface of the pipe and the intermediate portion along the area of the ribs 30 inflates against the inner surface of the pipe. A fully inflated condition of the apparatus is shown in FIGS. 3, 4A and 4B. FIG. 2 shows such inflated condition in broken lines. In this condition, ribs 30 maintain passageways 30a along the intermediate portion of the body member even though the latter is fully inflated. Conduits 44 and/or 46 are then disconnected from the air pressure and a suitable and conventional grout and catalyst then pumped through the conduits 44 and 46. Such grout and catalyst are mixed in mixing chamber 48 and then discharged through port 50. The grout will travel in opposite directions from the port 50 along passageways 30a. From such spaces, the grout flows into any opening in the pipe, and with suitable pressure will efficiently fill all the voids which may exist from a break in the pipeline. Pressure to the grout and catalyst may then be shut off and pressure to the chambers 32 released so that the body member can retract. The assembly may then be pulled out manually or if such cannot be accomplished, the operating thrust of the propelling head is reversed from that described above so that it will push the assembly rearwardly.

With reference to FIG. 5, control means is illustrated for operating the present apparatus. In this regard, a main pressure line 100 leads to inflating conduit 34 through a solenoid operated valve 102 and pressure regulator 103 for controlled inflation of the body member 10. The conduit 64 for operating the propelling head 54 is connected to the main pressure line through a solenoid operated valve 104 and pressure regulator 105, and conduits 86 controlling operation of the fluid operated cylinder 72 are connected to the main pressure line through solenoid operated valves 108. By suitable operation of the solenoid operated valves described, and suitable pressure regulation the desired functions described in the above operation are accomplished. Furthermore, by means of suitable rotating control means 110 and suitable electrical connections to solenoid operated valves 104 and 108, the operation of the propelling head 54 and the fluid operated cylinder 72 can be sequenced so as to provide automatic cycling of these two parts for traveling movement of the assembly in the pipe.

It is to be understood that the form of our invention herein shown and described is to be taken as a preferred example of the same and that various changes in the shape, size and arrangement of parts may be resorted to without departing from the spirit of our invention, or the scope of the subjoined claims.

Having thus described our invention, we claim:

1. Apparatus for repairing leaks in a pipe comprising
   (a) an elongated flexible body member arranged to be inserted in a pipe,
   (b) said body member having leading and trailing end portions,
   (c) said leading and trailing end portions being expandable,
   (d) an expandable intermediate portion on said body member of a length to span a leak in a pipe,
   (e) inflating means in said body member arranged to expand said leading and trailing end portions for sealing said ends against the interior surface of a pipe,
   (f) said intermediate portion also being expandable by said inflating means,
   (g) and grout carrying means in said body member for discharging grout along said intermediate portion and into a leak in a pipe,
   (h) the exterior surface of said expandable intermediate portion having longitudinal passageways for the flow of the grout in the expanded condition of said intermediate portion.

2. The apparatus of claim 1 wherein said passageways are formed by longitudinal spaced ribs.

3. The apparatus of claim 1 wherein said end portions are more flexible than said intermediate portion.

4. The apparatus of claim 1 including circumferential rib means on the outer surface of said end portions providing the seal against the interior surface of a pipe.

5. The apparatus of claim 1 including an expandabe head adjacent the leading end of said body member, means flexibly connecting said head to said body member, inflating means in said head arranged to expand it against the interior surface of a pipe to obtain a grip on the pipe, and double acting fluid operated cylinder means connected between said body member and said head whereby upon selected inflation and deflation of said head and operation of said fluid operated cylinder means said body member is arranged to be pulled along a pipe.

6. The apparatus of claim 6 wherein said means flexibly connecting said head to said body member comprises a tension spring.

7. The apparatus of claim 7 wherein said fluid operated cylinder means is secured to said body member and said means flexibly connecting said head to said body member comprises a tension spring connected between said head and said fluid operated cylinder.

8. Apparatus for repairing leaks in a pipe comprising
   (a) an elongated flexible body member arranged to be inserted in a pipe,
   (b) means in said body portion for supplying grout into a pipe for repairing a leak in the pipe,
   (c) an expandable head adjacent the leading end of said body member,
   (d) means flexibly connecting said head to said body member,
   (e) inflating means in said head arranged to expand it against the interior surface of a pipe to obtain a grip on the pipe,
   (f) and double acting fluid operated cylinder means connected between said body member and said head whereby upon selected inflation and deflation of said head and operation of said fluid operated cylinder means said body member is arranged to be pulled along a pipe.

9. The apparatus of claim 8 wherein said means flexibly connecting said head to said body member comprises a tension spring.

10. The apparatus of claim 8 wherein said fluid operated cylinder means is secured to said body member and said means flexibly connecting said head to said body member comprises a tension spring connected between said head and said fluid operated cylinder.

* * * * *